(12) United States Patent
Sugii et al.

(10) Patent No.: US 10,181,150 B2
(45) Date of Patent: Jan. 15, 2019

(54) METHOD, APPARATUS, AND MEDIUM

(71) Applicant: FUJITSU LIMITED, Kawasaki-shi, Kanagawa (JP)

(72) Inventors: Jun Sugii, Kobe (JP); Yosuke Naka, Kobe (JP); Hideo Nishi, Miki (JP); Tatsushige Inaba, Osaka (JP); Kiyotaka Iwamoto, Toyonaka (JP)

(73) Assignee: FUJITSU LIMITED, Kawasaki (JP)

( * ) Notice: Subject to any disclaimer, the term of this patent is extended or adjusted under 35 U.S.C. 154(b) by 647 days.

(21) Appl. No.: 14/638,691

(22) Filed: Mar. 4, 2015

(65) Prior Publication Data
US 2015/0278921 A1 Oct. 1, 2015

(30) Foreign Application Priority Data
Mar. 31, 2014 (JP) .................................. 2014-072168

(51) Int. Cl.
*G06Q 30/06* (2012.01)
*G06F 21/10* (2013.01)

(52) U.S. Cl.
CPC ......... *G06Q 30/0633* (2013.01); *G06F 21/10* (2013.01); *G06Q 2220/10* (2013.01); *G06Q 2220/12* (2013.01); *G06Q 2220/18* (2013.01)

(58) Field of Classification Search
CPC ..... G06Q 30/0633; G06Q 30/06; G06F 21/10
See application file for complete search history.

(56) References Cited

U.S. PATENT DOCUMENTS

| | | | | |
|---|---|---|---|---|
| 6,742,129 | B1* | 5/2004 | Higgs | G06F 21/123 380/202 |
| 8,892,473 | B2* | 11/2014 | Lao | G06F 21/10 705/51 |
| 8,996,421 | B2* | 3/2015 | Kahn | G06F 21/10 705/59 |
| 9,471,756 | B2* | 10/2016 | Sung | G06Q 30/0205 |
| 2002/0131404 | A1* | 9/2002 | Mehta | G06F 8/61 370/352 |
| 2002/0194008 | A1* | 12/2002 | Yang | G06Q 40/02 709/230 |

(Continued)

FOREIGN PATENT DOCUMENTS

| | | |
|---|---|---|
| JP | 2002-140532 A | 5/2002 |
| JP | 2002-229661 A | 8/2002 |

(Continued)

OTHER PUBLICATIONS

Office Action, dated Feb. 6, 2018, issued in counterpart Japanese Patent Application No. 2014-072168 (w/ English machine translation; 7 pages).

*Primary Examiner* — Nicholas D Rosen
(74) *Attorney, Agent, or Firm* — Westerman, Hattori, Daniels & Adrian, LLP

(57) ABSTRACT

An apparatus includes a processor configured to execute a process including: acquiring purchase propriety information and purchase condition information of software by unit of an account or a device before receiving a purchase request of the software, determining propriety of the purchase request based on the acquired purchase propriety information and purchase condition information when the purchase request of the software is received, and transmitting the purchase request when the purchase request is determined to be valid.

7 Claims, 22 Drawing Sheets

(56) References Cited

U.S. PATENT DOCUMENTS

| | | | | |
|---|---|---|---|---|
| 2003/0028786 A1* | 2/2003 | Mustafa | ............... | G06F 21/10 |
| | | | | 713/189 |
| 2003/0028787 A1* | 2/2003 | Fayed | ................. | G06F 21/10 |
| | | | | 713/189 |
| 2006/0242081 A1* | 10/2006 | Ivanov | ................. | G06F 21/10 |
| | | | | 705/59 |
| 2007/0055675 A1* | 3/2007 | Oosawa | ................. | G06F 8/61 |
| 2007/0265967 A1* | 11/2007 | Kahn | .................. | G06F 21/10 |
| | | | | 705/51 |
| 2007/0299779 A1* | 12/2007 | Sung | ................ | G06F 21/121 |
| | | | | 705/51 |
| 2012/0167229 A1* | 6/2012 | Lao | .................... | G06F 21/10 |
| | | | | 726/26 |
| 2012/0303476 A1* | 11/2012 | Krzyzanowski | ...... | G06F 8/60 |
| | | | | 705/26.5 |

FOREIGN PATENT DOCUMENTS

| | | |
|---|---|---|
| JP | 2003-22142 | 1/2003 |
| JP | 2005-321850 | 11/2005 |

* cited by examiner

FIG. 4

| APPLICATION CODE | APPLICATION NAME | UNIT PRICE | LICENSE ARCHITECTURE CODE |
|---|---|---|---|
| com.apl001 | APPLICATION A | 1000 | 001 |
| com.apl002 | APPLICATION B | 1000 | 001 |
| com.apl003 | APPLICATION C | 3000 | 001 |
| com.apl004 | APPLICATION D | 1000 | 002 |
| com.apl005 | APPLICATION E | 2000 | 001 |

FIG. 5

| APPLICATION CODE | ASSIGNMENT ID |
|---|---|
| com.apl001 | USER001 |
| com.apl001 | USER002 |
| com.apl003 | USER001 |
| com.apl003 | USER003 |
| com.apl003 | USER004 |
| com.apl004 | COMPUTER001 |

FIG. 6

| CODE | MANAGEMENT UNIT |
|------|-----------------|
| 001  | ACCOUNT UNIT    |
| 002  | COMPUTER UNIT   |

| APPLICATION CODE | PROHIBITION REASON |
|---|---|
| com.apl005 | LICENSE PERMISSION DISCORDANCE |
| com.apl006 | UNIT PRICE DISCORDANCE |
| com.apl007 | EXCESS OF TOTAL BUDGET |
| com.apl008 | OUT OF RANGE OF VARIATION WIDTH |

FIG. 8

| COLLATION METHOD ID | METHOD |
|---|---|
| 001 | APPLICATION IS PURCHASABLE WHEN UNIT PRICES MATCH EACH OTHER AND LICENSING ARCHITECTURES MATCH EACH OTHER |
| 002 | APPLICATION IS PURCHASABLE IF PRICE IS WITHIN TOTAL BUDGET |
| 003 | APPLICATION IS PURCHASABLE UNDER CONDITION IN WHICH UNIT PRICE OF APPLICATION IS WITHIN VARIATION WIDTH |

FIG. 9A

| KEY | VALUE |
|---|---|
| APP_Purchase_Chk_ID | 001 |
| APP_Purchase_Chk_DTL | |

FIG. 9B

| KEY | VALUE |
|---|---|
| APP_Purchase_Chk_ID | 002 |
| APP_Purchase_Chk_DTL | 1000 |

FIG. 9C

| KEY | VALUE |
|---|---|
| APP_Purchase_Chk_ID | 003 |
| APP_Purchase_Chk_DTL | 10 |

METHOD, APPARATUS, AND MEDIUM

CROSS-REFERENCE TO RELATED APPLICATION

This application is based upon and claims the benefit of priority of the prior Japanese Patent Application No. 2014-072168 filed on Mar. 31, 2014, the entire contents of which are incorporated herein by reference.

FIELD

The embodiment discussed herein is related to a method, an apparatus, and a medium.

BACKGROUND

In recent years, a method regarding download or installation of an application to a terminal or a smart device has been changed to a method in which the user is able to purchase an application directly from a store and download the purchased application. Here, examples of the smart device include a smartphone, a tablet device, or the like.

In, for example, a company, it is important to manage software that is installed on a terminal or a smart device, in relation to a license contract and the like. However, since a manager of a terminal or a smart device and an operator of an application store are different from each other, it is difficult for the manager of a terminal or a smart device to control download or installation on a store side.

There is a method in which, through an agent installed on a terminal or a smart device, an application is downloaded from a store and installed. The agent receives purchase propriety information of an application from a property management apparatus performing license management and the like and determines whether to download the application based on the purchase propriety information, when the application is downloaded.

There is a technique, as a technique relating to the license management, in which an information processing terminal transmits, to a license authorization server, authentication data at the time of requesting a license authorization, and when a new key is received in response to the authorization request, execution of software is permitted.

There is a technique in which a user transmits a software individual identification number and a random number to a host computer when software is installed on a user computer. The host computer generates an installation continuation key from both the numbers and transmits the key to the user computer if the remaining number of licenses is one, whereby the user computer continues installation of the software.

Examples of the related art are Japanese Laid-open Patent Publication No. 2005-321850, and Japanese Laid-open Patent Publication No. 2003-22142.

SUMMARY

According to an aspect of the invention, an apparatus includes a processor configured to execute a process including: acquiring purchase propriety information and purchase condition information of software by unit of an account or a device (or a terminal or an apparatus) before receiving a purchase request of the software, determining propriety of the purchase request based on the acquired purchase propriety information and purchase condition information when the purchase request of the software is received, and transmitting the purchase request when the purchase request is determined to be valid.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of application list information;

FIG. 5 is a diagram illustrating an example of license permission information;

FIG. 6 is a diagram illustrating an example of licensing architecture information;

FIG. 8 is a diagram illustrating an example of application purchase collation information;

FIG. 9A is a diagram illustrating an example of operation policy information (when a collation method of application purchase is indicated by "001");

FIG. 9B is a diagram illustrating an example of operation policy information (when a collation method of application purchase is indicated by "002");

FIG. 9C is a diagram illustrating an example of operation policy information (when a collation method of application purchase is indicated by "003");

DESCRIPTION OF EMBODIMENT

First, consideration of the inventors will be described. When purchase propriety information of an application is transmitted from a property management apparatus to an agent or the like, there is a problem in that a purchase condition at the time of transmitting purchase propriety information and a purchase condition at the time of purchasing and downloading an application from a store are different from each other. For example, a price, which is one of purchase conditions, may be reconsidered or the price may fluctuate due to a campaign or the like. A licensing architecture involved in the price may fluctuate.

According to an embodiment which will be described later, it is possible to accurately determine propriety of purchasing even when the purchase condition of the application is different from that at the time of distribution from the property management apparatus.

Hereinafter, the embodiment of a purchase control apparatus, a purchase control method, and a purchase control program which are disclosed in the present disclosure will be described in detail with reference to the accompanying drawings. A disclosed technique is not limited to this embodiment.

Embodiment

Figure 1:
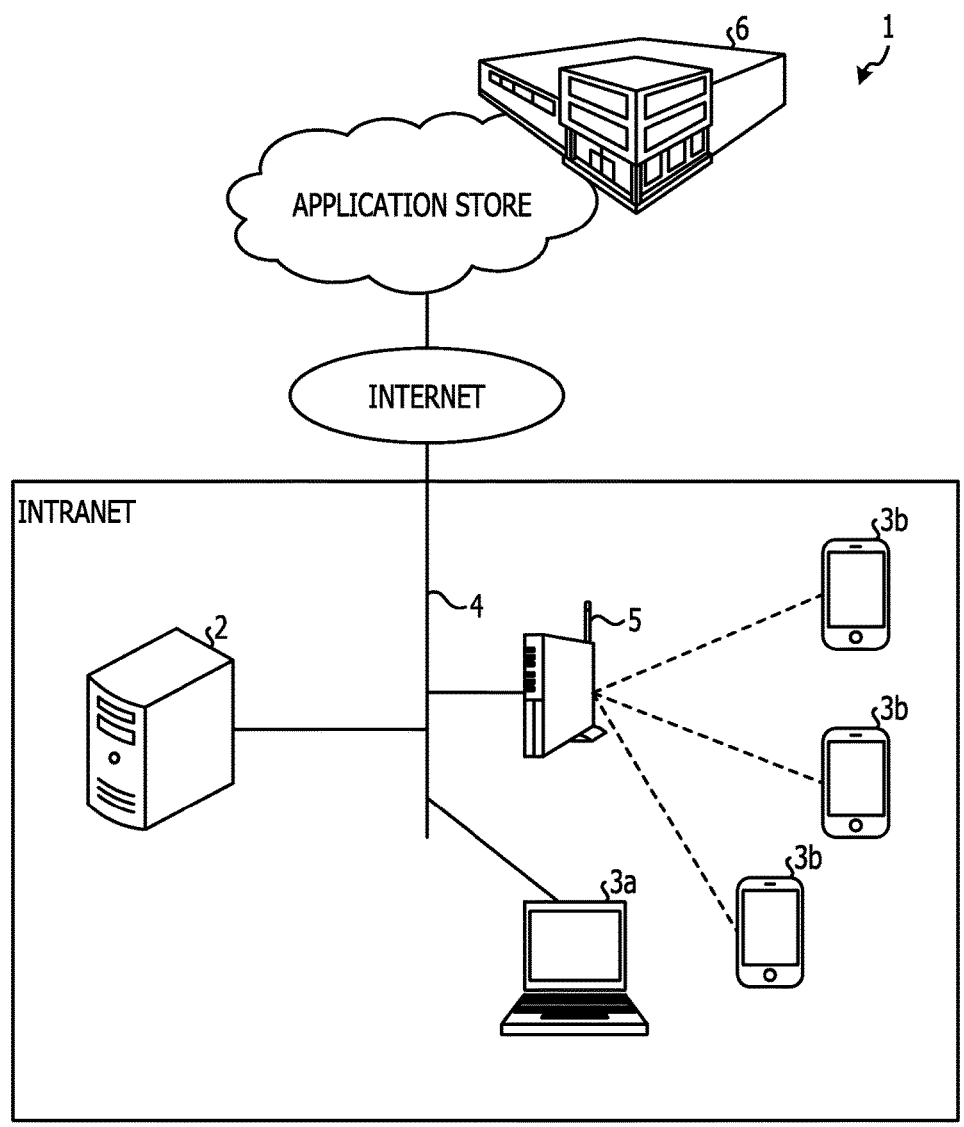
FIG. 1 is a diagram illustrating a configuration of a property management system according to an embodiment.

A configuration of a property management system according to the embodiment will be described. FIG. 1 is a diagram illustrating the configuration of the property management system according to the embodiment. As illustrated in FIG. 1, the property management system 1 includes a management apparatus 2, a computer 3a, three smart devices 3b, and an application store 6.

The management apparatus 2, the computer 3a, the three smart devices 3b, and the application store 6 are connected to each other over a network 4. The three smart devices 3b are connected to the network 4 through a wireless access point 5. The network 4 is separated into an intranet for connecting the management apparatus 2, the computer 3a, and the three smart devices 3b, and the Internet for connecting the management apparatus 2, the computer 3a, and the three smart devices 3b to the application store 6.

For the convenience of description, only the one computer 3a and the three smart devices 3b are illustrated in FIG. 1, but the property management system 1 includes any number of computers and smart devices. The property management system 1 includes other information communication apparatuses that execute an application.

The management apparatus 2 manages hardware and software of an information communication apparatus such as the computer 3a or the smart device 3b in the intranet as property, and manages a license of software that is installed on the computer 3a or the smart device 3b.

The computer 3a is used for creating a document by a user or transmitting and receiving mail, for example. The smart device 3b is used for reading a web page by a user or transmitting and receiving mail.

The application store 6 stores application information on a price of an application, a licensing architecture or the like with the application, and manages sales of the application. The application store 6 receives a download request from the computer 3a or the smart device 3b and transmits an application to the computer 3a or the smart device 3b.

Figure 2:
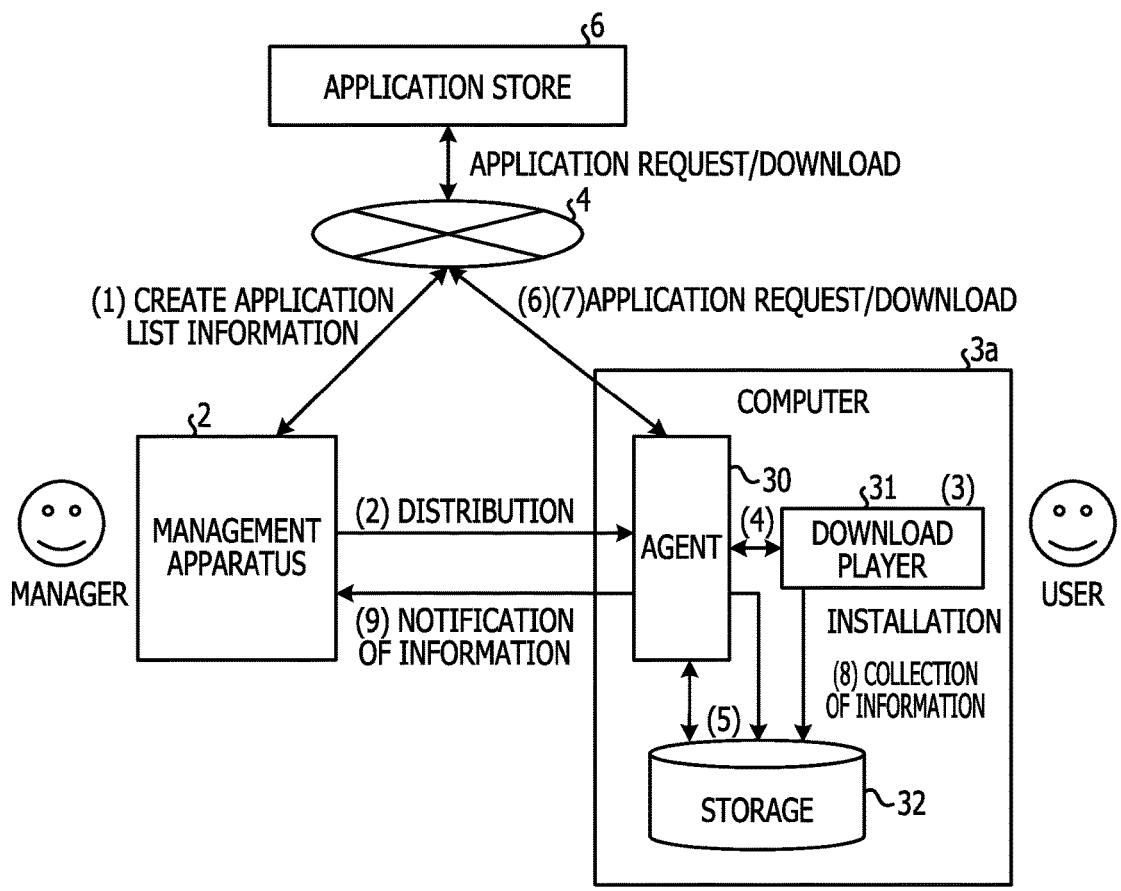
FIG. 2 is a diagram for explaining an operation of the property management system according to the embodiment.

An operation of the property management system 1 according to the embodiment will be described. FIG. 2 is a diagram for explaining the operation of the property management system 1 according to the embodiment. Here, a case in which the computer 3a downloads an application will be described, but the operation is similar to that in a case where other information communication apparatuses such as the smart device 3b download an application.

As illustrated in FIG. 2, the management apparatus 2 acquires purchase condition information including a unit price and a licensing architecture of an application from the application store 6, and creates an application list. The management apparatus 2 registers information of an application selected as a license management target in the application list by a manager and information of a user permitted to install as license permission information (1).

The management apparatus 2 distributes the license permission information and application list information to an agent 30 (2). The agent 30 stores the distributed license permission information and application list information in a storage 32. Here, the agent 30 refers to a functional section that collects inventory information being information on hardware and software of the computer 3a, transmits the inventory information to the management apparatus 2, and controls in order to download an application. Detail of the agent 30 will be described later.

If a download player 31 tries to download an application base on an instruction of a user (3), the agent 30 receives a download request from the download player 31 (4). Here, the download player 31 refers to a functional section that downloads the application and installs the downloaded application on the computer 3a.

The agent 30 collates the application to be downloaded with the license permission information. As a result, when the application to be downloaded matches the license permission information, the agent 30 collates the application list information stored in the storage 32 with regard to the application to be downloaded with purchase condition information provided from the application store 6 (5).

When the application list information matches the purchase condition information, the agent 30 transmits an application request to the application store 6 (6), and downloads an application from the application store 6 (7). The download player 31 installs the application downloaded by the agent 30. When the application list information does not match the purchase condition information, the agent 30 does not transmit the download request to the application store 6.

The agent 30 collects the inventory information including the application installed on the computer 3a. At that time, the agent 30 notifies the management apparatus 2 of a reason for not transmitting the download request and information of the application with the inventory information.

The management apparatus 2 provides the manager with information notified from the computer 3a, and when the application of which the download request is not transmitted is determined to be a target of license management by the manager, the management apparatus 2 adds the application of which the download request is not transmitted to a license management target.

In this manner, the agent 30 prohibits download of the application when the purchase condition information distributed from the management apparatus 2 does not match the purchase condition information acquired from the application store 6. Accordingly, the agent 30 can block an application having a different purchase condition from a purchase condition that is managed by the management apparatus 2 to be installed on the computer 3a.

The agent 30 notifies the management apparatus 2 of information of the application prohibited from downloading. The management apparatus 2 provides the manager with the notified information. Accordingly, the manager can perceive information of application desired by the user.

Figure 3:
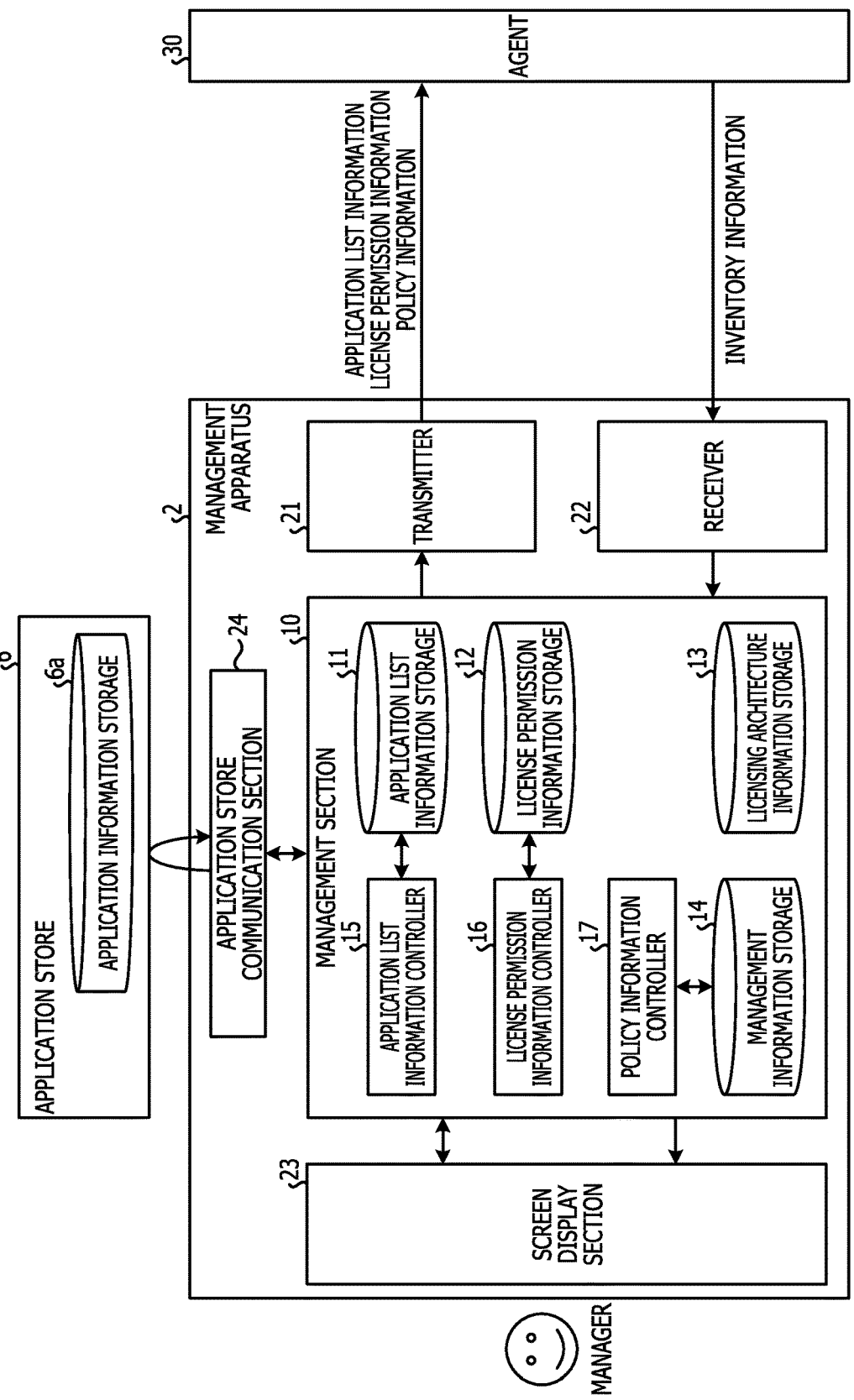
FIG. 3 is a diagram illustrating a functional configuration of a management apparatus.

A functional configuration of the management apparatus 2 will be described. FIG. 3 is a diagram illustrating the functional configuration of the management apparatus 2. As illustrated in FIG. 3, the management apparatus 2 includes a management section 10, a transmitter 21, a receiver 22, a screen display section 23, and an application store communication section 24.

The management section 10 manages hardware property and software property of the information communication apparatus such as the computer 3a or the smart device 3b based on an instruction of the manager. The management section 10 distributes information on property management to the information communication apparatus such as the computer 3a or the smart device 3b, and stores and collects the inventory information of the information communication apparatus such as the computer 3a or the smart device 3b.

The management section 10 includes an application list information storage 11, a license permission information storage 12, a licensing architecture information storage 13, a management information storage 14, an application list information controller 15, a license permission information controller 16, and a policy information controller 17.

The application list information storage 11 stores the application list information. FIG. 4 is a diagram illustrating an example of the application list information. As illustrated in FIG. 4, the application list information includes an application code, an application name, a unit price thereof and a licensing architecture code.

The application code refers to an identification code for identifying the application. The application name refers to a title for identifying the application. The unit price refers to a price when one application is installed and used. The licensing architecture code refers to an identification code for identifying the licensing architecture. For example, an application having the identification code of "com.apl001" and the name of "application A" has a price of "1000" when one application is installed and used, and has an identification code for a licensing architecture of "001".

The license permission information storage 12 stores the license permission information as the purchase propriety information. FIG. 5 is a diagram illustrating an example of the license permission information. As illustrated in FIG. 5, the license permission information includes the application code and an assignment ID. The assignment ID refers to an identification code for identifying a user to which a license is allocated. For example, the application having the identification code of "com.apl001" is allocated to a user having the identification code of "USER001".

The licensing architecture information storage 13 stores the licensing architecture information being information on the licensing architecture for each of licensing architecture. FIG. 6 is a diagram illustrating an example of the licensing architecture information. As illustrated in FIG. 6, the licensing architecture information includes a code and a management unit. The code refers to a licensing architecture code. The management unit refers to a unit for managing the license. For example, the license having a licensing architecture code of "001" is managed by "account unit" (a unit for managing the license by the account).

Figures 7A, 7B:
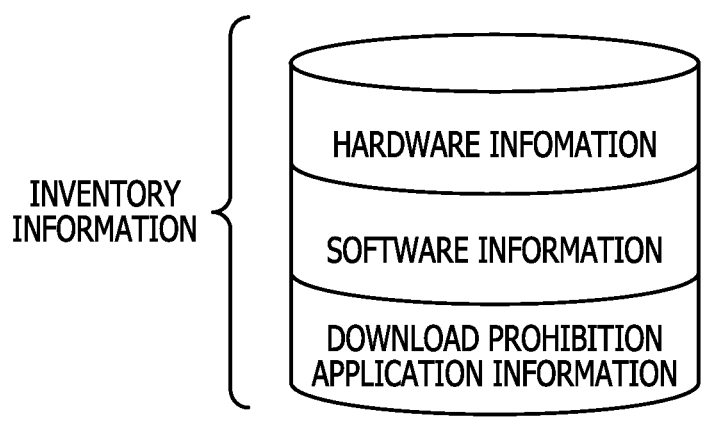
FIG. 7A is a diagram illustrating an example of inventory information.
FIG. 7B is a diagram illustrating an example of download prohibition application information.

The management information storage 14 stores information on property management as management information. The management information includes policy information and the inventory information. FIG. 7A is a diagram illustrating an example of the inventory information. As illustrated in FIG. 7A, the inventory information includes hardware information, software information, and download prohibition application information. The hardware information refers to information on a type of each information communication apparatus in the intranet, memory capacity, hard disk capacity, and the like. The software information refers to information on, for example, a type of an OS or application installed on the each information communication apparatus in the intranet.

The download prohibition application information refers to information on an application that is prohibited from be downloaded by the agent 30. FIG. 7B is a diagram illustrating an example of the download prohibition application information. As illustrated in FIG. 7B, the download prohibition application information includes the application code and a prohibition reason. The prohibition reason indicates a reason for prohibition of downloading. For example, an application having the identification code of "com.apl005" does not have license permission corresponding to the application (license permission mismatch), and thus is prohibited from being downloaded.

The policy information refers to information on a policy of property management. The policy information includes application purchase collation information and operation policy information. The application purchase collation information refers to information indicating a collation method in which information distributed from the management apparatus 2 collates with information acquired from the application store 6 when an application is to be downloaded. FIG. 8 is a diagram illustrating an example of the application purchase collation information. As illustrated in FIG. 8, the application purchase collation information includes a collation method ID and a method. The collation method ID refers to an identifier for identifying a collation method.

The method indicates a method of collating and there are three methods in the present disclosure. In a first method, an application is purchasable when a unit price and a licensing architecture of the application in the application list information matches a unit price and a licensing architecture of the application in information acquired from the application store 6. The operation illustrated in FIG. 2 is based on the first method.

In a second method, an application is purchasable if the price thereof is within a total budget based on a balance capable of purchasing and a price acquired from the application store 6. In a third method, an application is purchasable under a condition in which a proportion of an amount of variation between unit price of the application in the application list information and the unit price of the application in information acquired from the application store 6 is within a variation width. For example, a method with an identifier for identifying the collation method being "001" refers to a method in which an application is purchasable when unit prices of the application matches each other and licensing architectures matches each other.

The operation policy information is for specifying a collation method at the time of application purchase and represents information desirable for collation. FIGS. 9A to 9C are diagrams illustrating an example of the operation policy information. FIG. 9A is a diagram illustrating an example of operation policy information (when a collation method of application purchase is indicated by "001"). FIG. 9B is a diagram illustrating an example of operation policy information (when a collation method of application purchase is indicated by "002"). FIG. 9C is a diagram illustrating an example of operation policy information (when a collation method of application purchase is indicated by "003").

As illustrated in FIGS. 9A to 9C, the operation policy information includes Key and Value. Key refers to APP_Purchase_Chk_ID indicating the collation method ID or APP_Purchase_Chk_DTL representing collation detail information. Value refers to a value of Key.

As illustrated in FIG. 9A, the collation detail information is absent when the collation method ID is "001". As illustrated in FIG. 9B, the collation detail information has "1000" when the collation method ID is "002", and the "1000" indicates a balance capable of purchasing. As illustrated in FIG. 9C, the collation detail information has "10" when the collation method ID is "003", and the "10" indicates an allowable variation width in a price by %.

Referring back to FIG. 3, the application list information controller 15 acquires information on an application from the application store 6 to create the application list information and registers the created application list information in the application list information storage 11. The application store 6 has an application information storage 6a and stores the application information in the application information storage 6a. The application list information controller 15 updates the application list information based on an instruction of the manager. The application list information controller 15 distributes the application list information to the agent 30.

The license permission information controller 16 registers information of an application selected as a license management target in the application list by the manager and information of a user permitted to install the application in the license permission information storage 12. The license permission information controller 16 updates the license permission information based on an instruction of the manager. The license permission information controller 16 distributes the license permission information to the agent 30.

The policy information controller 17 creates the policy information based on an instruction of the manager and registers the created policy information in the management information storage 14. The policy information controller 17 updates the policy information based on an instruction of the manager. The policy information controller 17 distributes the policy information to the agent 30.

The transmitter 21 transmits the application list information, the license permission information, the policy information, and the like to the agent 30. The receiver 22 receives the inventory information and the like from the agent 30. The screen display section 23 displays the application list information or the license permission information on a display apparatus and receives an instruction from the manager. The application store communication section 24 communicates with the application store 6 and acquires, for example, information on an application.

Figure 10:
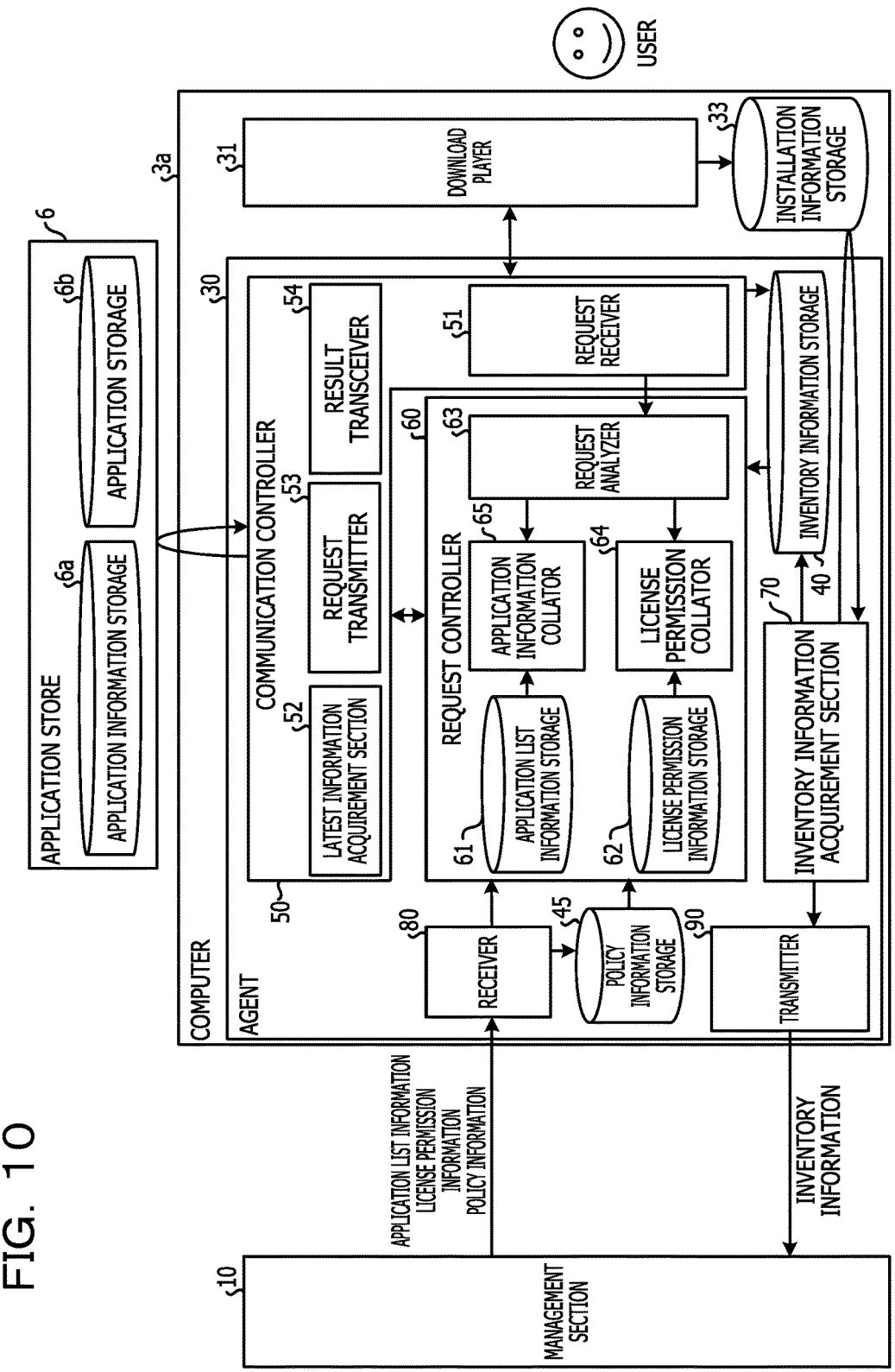
FIG. 10 is a diagram illustrating a functional configuration of an agent.

A functional configuration of the agent 30 will be described below. The agent 30 is realized as a local proxy in the computer 3a. FIG. 10 is a diagram illustrating the functional configuration of the agent 30. As illustrated in FIG. 10, the agent 30 includes an inventory information storage 40, a policy information storage 45, a communication controller 50, a request controller 60, an inventory information acquisition section 70, a receiver 80, and a transmitter 90.

The inventory information storage 40 stores the inventory information of the computer 3a. The policy information storage 45 stores the policy information distributed from the management section 10.

The communication controller 50 receives a download request that is transmitted by the download player 31 and controls downloading. The communication controller 50 includes a request receiver 51, a latest information acquirement section 52, a request transmitter 53, and a result transceiver 54.

The request receiver 51 receives a download request of an application from the download player 31 and transfers the received download request to the request controller 60. The latest information acquirement section 52 acquires the latest information of an application requested to be downloaded from the application store 6 and transfers the acquired information to the request controller 60.

The request transmitter 53 transmits the download request to the application store 6 when the request controller 60 permits to download the application. The result transceiver 54 receives the application transmitted by the application store 6 in response to the download request and transfers the received application to the download player 31.

The application store 6 stores the application in an application storage 6b, and if the download request is received, the application store 6 reads the requested application from the application storage 6b and transmits the read application to the agent 30. The download player 31 receives the application from the agent 30 and installs the received application. Information on the installed application is stored in an installation information storage 33.

The request controller 60 determines whether to permit the download request received from the request receiver 51. When permitting, the request controller 60 instructs the communication controller 50 to download the application. When not permitting, the request controller 60 notifies the download player 31 to prohibit downloading of the application. The request controller 60 includes an application list information storage 61, a license permission information storage 62, a request analyzer 63, a license permission collator 64, and an application information collator 65.

The application list information storage 61 stores the application list information distributed from the management section 10. The license permission information storage 62 stores the license permission information distributed from the management section 10.

The request analyzer 63 analyses the download request received from the request receiver 51 and transfers an application code of the application to be downloaded to the license permission collator 64 and the application information collator 65. The request analyzer 63 extracts an account from the inventory information storage 40 and transfers the extracted account to the license permission collator 64.

The license permission collator 64 collates the application code and the account transferred from the request analyzer 63 with that in the license permission information storage 62 and determines whether or not to permit the download request based on the collation result. The license permission collator 64 transfers the determination result to the request controller 60.

The application information collator 65 instructs the latest information acquirement section 52 to acquire the latest information from the application store 6 based on the application code transferred from the request analyzer 63. The application information collator 65 determines whether or not to permit the download request based on the latest information of the application acquired by the latest information acquirement section 52, the application list information, and the policy information. The application information collator 65 transfers the determination result to the request controller 60.

The application information collator 65 determines a method of determining whether or not to permit the download request, based on the operation policy information stored in the policy information storage 45 and the application purchase collation information.

The inventory information acquirement section 70 collects the inventory information referring to the installation information storage 33 and the like, and stores the collected inventory information to the inventory information storage 40. The receiver 80 receives the application list information, the license permission information, and the policy information that are transmitted by the management section 10. The receiver 80 respectively stores the received application list information, the received license permission information, and the received policy information in the application list information storage 61, the license permission information storage 62, and the policy information storage 45. The transmitter 90 transmits the inventory information and the like to the management section 10.

Figure 11:
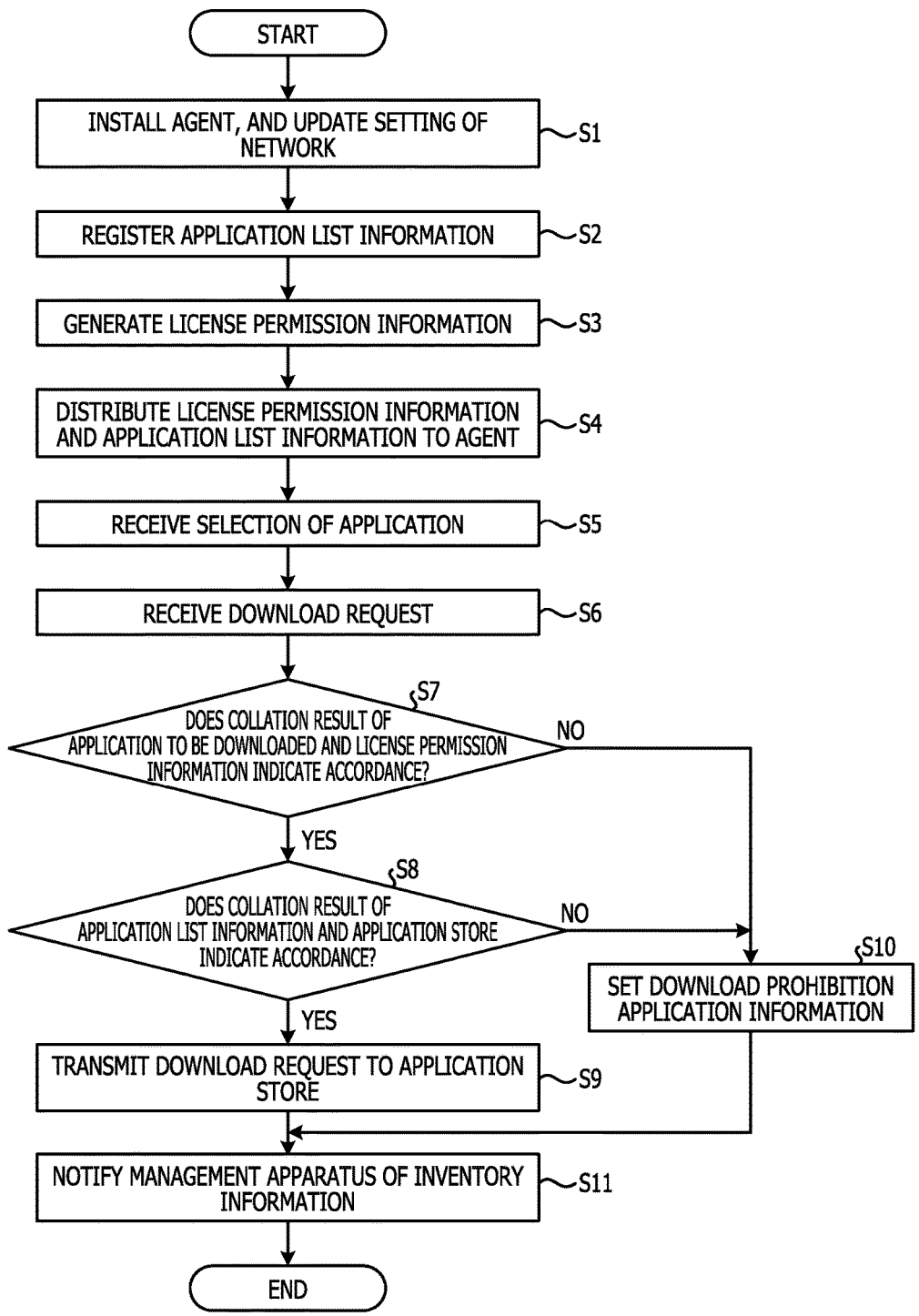
FIG. 11 is a flowchart illustrating a flow of processing of the property management system.

A flow of processing of the property management system 1 will be described below. FIG. 11 illustrates a case in which the collation method ID is "001". FIG. 11 is a flowchart illustrating the flow of processing of the property management system 1. As illustrated in FIG. 11, the agent 30 is installed on the information communication apparatus such as the computer 3a or the smart device 3b and setting of the network 4 is updated in the information communication apparatus (step S1).

The management apparatus 2 registers the application list information (step S2), and generates the license permission information (step S3). The management apparatus 2 distributes the license permission information and the application list information to the agent 30 (step S4).

The download player 31 receives a selection of an application from a user (step S5), and transmits a download request. Then, the agent 30 receives the download request (step S6), and collates the application to be downloaded with the license permission information. The agent 30 determines whether or not the collation result of the application to be downloaded and the license permission information indicates accordance (step S7). When discordance is indicated, the agent 30 sets the download prohibition application information (step S10).

When the collation result indicates accordance, the agent 30 collates the application list information with information acquired from the application store 6. The agent 30 determines whether or not the collation result of the application list information and the information acquired from the application store 6 indicates accordance (step S8). When discordance is indicated, the agent 30 sets the download prohibition application information (step S10). When the collation result indicates accordance, the agent 30 transmits the download request to the application store 6 (step S9).

The agent 30 notifies the management apparatus 2 of the inventory information at a timing specified in the policy information (step S11).

In this manner, the agent 30 prohibits downloading when the collation result of the application list information and the information acquired from the application store 6 indicates discordance. Accordingly, it is possible to block excess of the purchase budget due to an increase in price of an application or the like.

Figure 12:
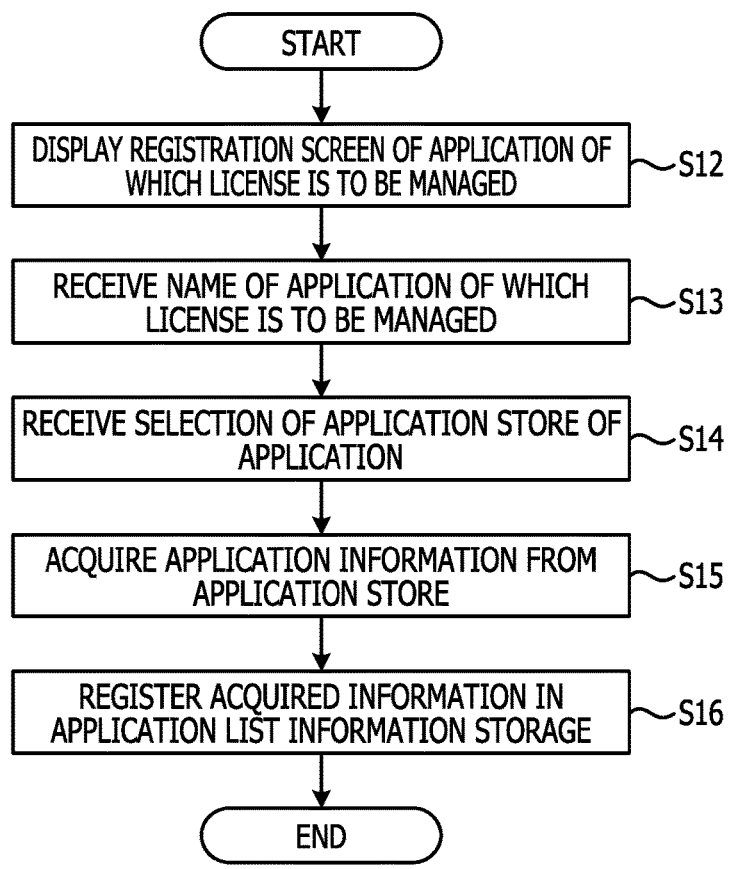
FIG. 12 is a flowchart illustrating a flow of processing of registering application list information.

A flow of processing of registering the application list information will be described below. FIG. 12 is a flowchart illustrating a flow of the processing of registering application list information. The processing illustrated in FIG. 12 corresponds to the process of step S2 illustrated in FIG. 11.

As illustrated in FIG. 12, the application list information controller 15 displays a registration screen of an application of which the license is to be managed on the display apparatus (step S12), and receives the name of the application of which the license is to be managed from the manager (step S13).

The application list information controller 15 receives selection of the application store 6 that sells the application of which the name is received from the manager (step S14), and acquires application information from the application store 6 (step S15). The application list information controller 15 registers the acquired information in the application list information storage 11 (step S16).

In this manner, the application list information controller 15 acquires information on the specified application by the manager from the application store 6, and thus the application list information may be stored in the application list information storage 11.

Figure 13:
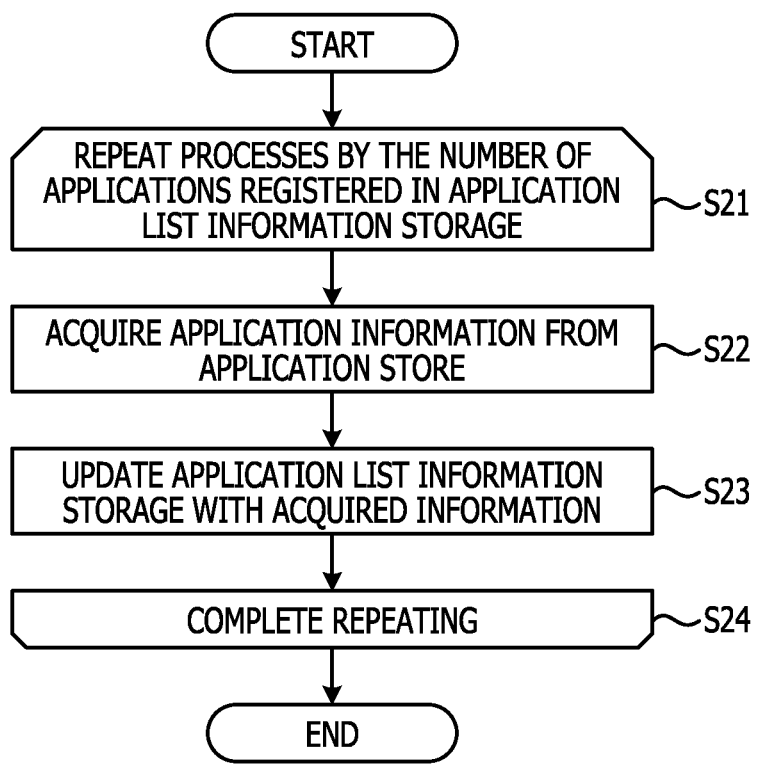
FIG. 13 is a flowchart illustrating a flow of processing of updating the application list information.

A flow of processing of updating the application list information will be described below. FIG. 13 is a flowchart illustrating the flow of the processing of updating the application list information. The processing of updating the application list information is performed a predetermined number of times such as once a day.

As illustrated in FIG. 13, the application list information controller 15 repeats processes interposed between S21 and S24 by the number of applications registered in the application list information storage 11.

The application list information controller 15 acquires the application information from the application store 6 (step S22), and updates the application list information storage 11 with the acquired application information (step S23).

In this manner, the application list information controller 15 updates the application list information storage 11 the predetermined number of times, and thus it is possible to store the latest application information as possible in the application list information storage 11.

Figure 14:
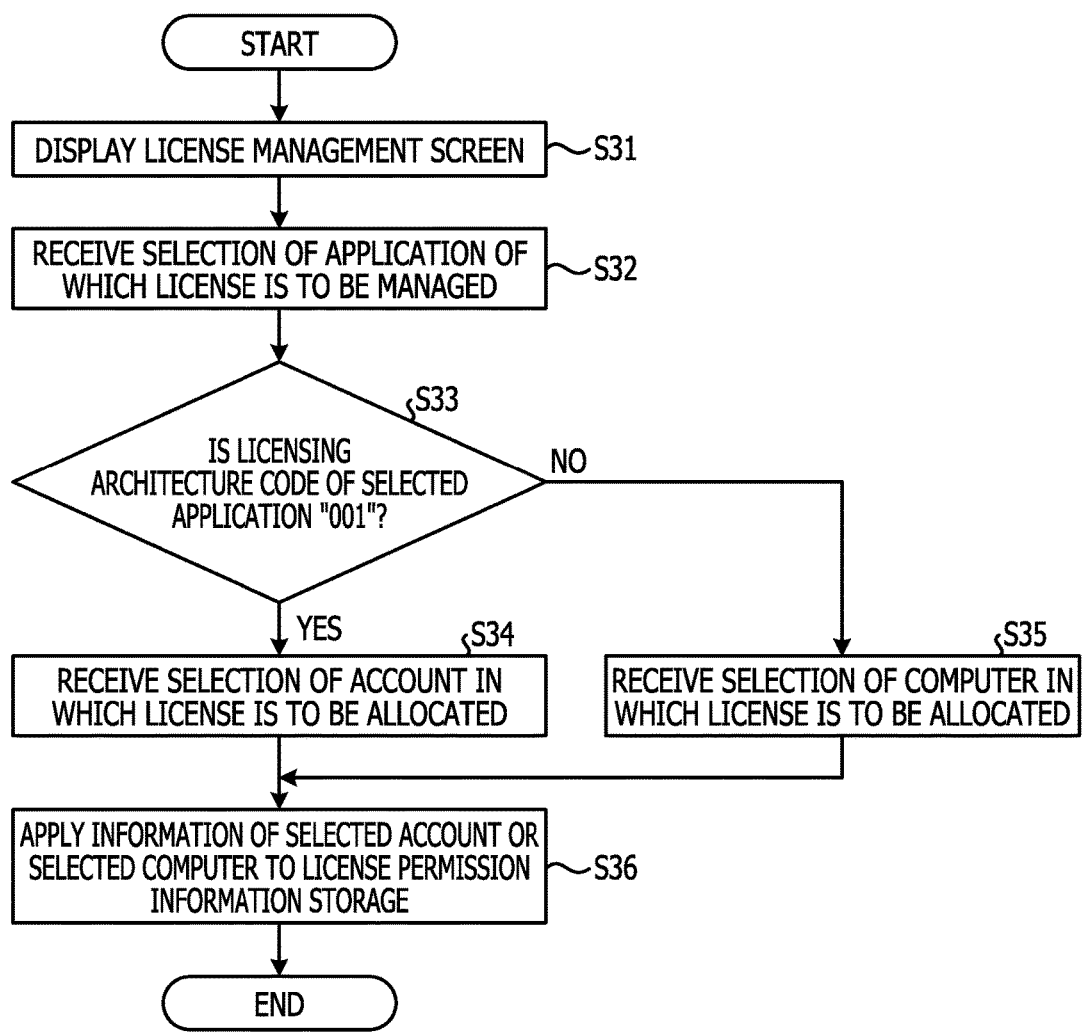
FIG. 14 is a flowchart illustrating a flow of processing of generating license permission information.

A flow of processing of generating the license permission information will be described below. FIG. 14 is a flowchart illustrating the flow of the processing of generating the license permission information. The processing illustrated in FIG. 14 corresponds to the process of step S3 illustrated in FIG. 11.

As illustrated in FIG. 14, the license permission information controller 16 displays a license management screen on the display apparatus (step S31), and receives selection of an application of which the license is to be managed (step S32).

The license permission information controller 16 determines whether or not a licensing architecture code of the selected application is "001" (step S33). As a result, when the licensing architecture code is "001", the license permission information controller 16 receives selection of an account in which the license is to be allocated from the manager (step S34). When the licensing architecture code is not "001", the license permission information controller 16 receives selection of a computer in which the license is to be allocated from the manager (step S35).

The license permission information controller 16 applies information of the selected account or the selected computer to the license permission information storage 62 (step S36).

In this manner, the license permission information controller 16 may generate the license permission information based on an instruction of the manager.

Figure 15:
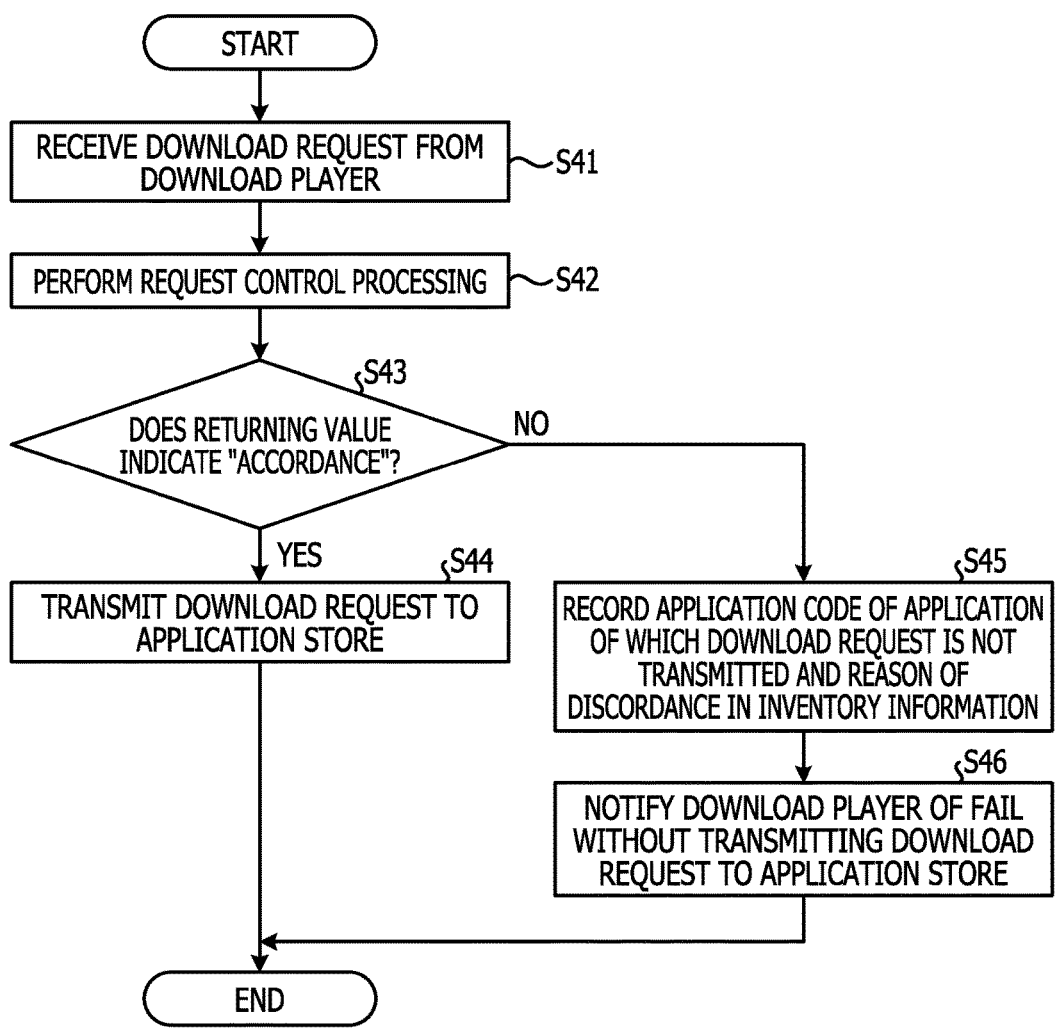
FIG. 15 is a flowchart illustrating a flow of download processing performed by the agent.

A flow of download processing performed by the agent 30 will be described below. FIG. 15 is a flowchart illustrating a flow of the download processing performed by the agent 30. As illustrated in FIG. 15, the agent 30 receives a download request from the download player 31 (step S41).

The agent 30 performs request control processing of determining whether or not to permit download (step S42). The agent 30 determines whether or not a returning value in the request control processing indicates "accordance" (step S43). When indicating "accordance", the agent 30 transmits the download request to the application store 6 (step S44).

When the returning value in the request control processing does not indicate "accordance", the agent 30 records the application code of an application of which the download request is not transmitted and a reason of discordance in the inventory information (step S45). The agent 30 notifies the download player 31 of fail without transmitting the download request to the application store 6 (step S46).

In this manner, the agent 30 determines whether or not to permit download in response to the download request from the download player 31, and thus the property management system 1 may manage an application purchase budget.

Figure 16:
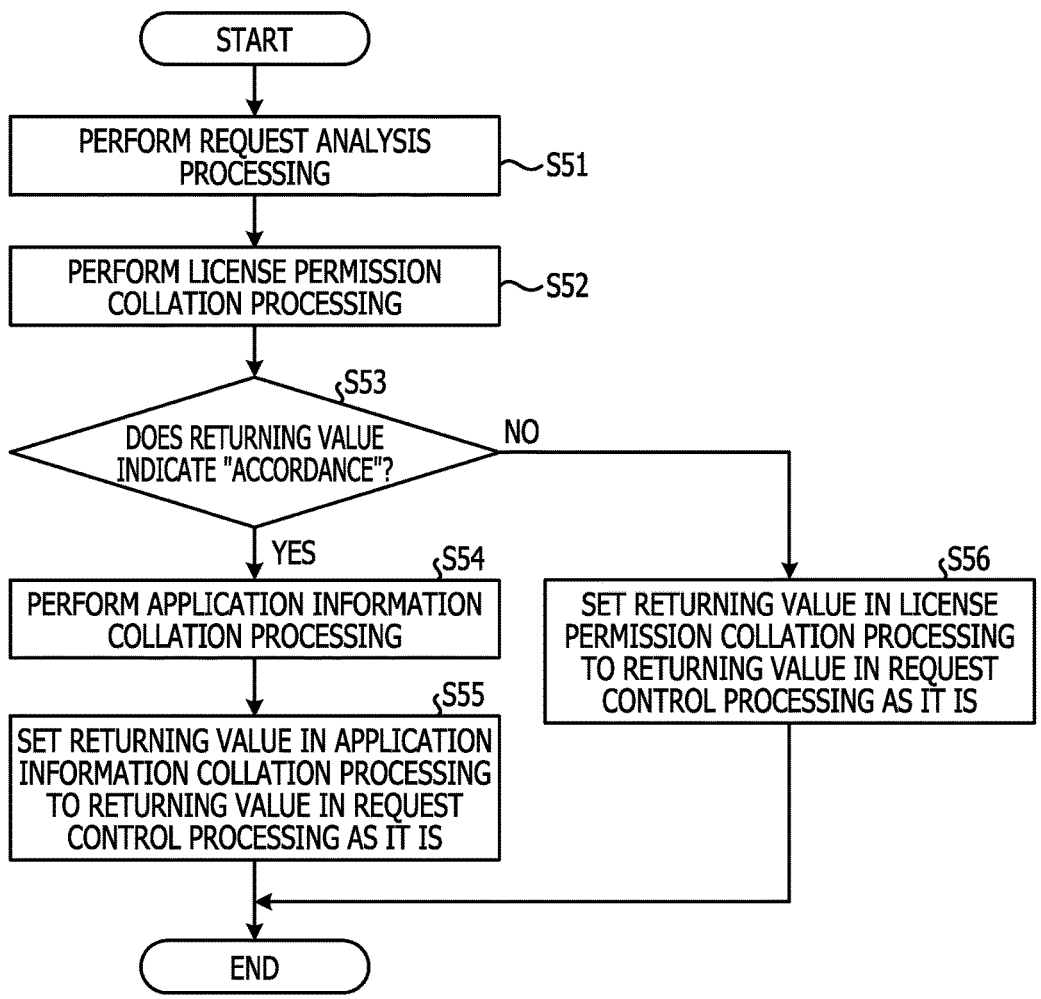
FIG. 16 is a flowchart illustrating a flow of request control processing.

A flow of request control processing will be described below. FIG. 16 is a flowchart illustrating the flow of the request control processing. As illustrated in FIG. 16, the request controller 60 performs request analysis processing of analyzing a download request (step S51). The request controller 60 performs license permission collation processing of determining whether a license of an application specified as a download target by the request analysis processing is allocated (step S52).

The request controller 60 determines whether or not a returning value in license permission collation processing indicates "accordance" (step S53). As a result, when indicating "accordance", the request controller 60 performs application information collation processing of determining whether the application list information matches the latest information provided by the application store 6 (step S54). The request controller 60 sets the returning value in the application information collation processing to a returning value in the request control processing as it is (step S55).

When the returning value in the license permission collation processing does not indicate "accordance", the request controller 60 sets the returning value in the license permission collation processing to the returning value in the request control processing as it is (step S56).

In this manner, the request controller 60 performs the license permission collation processing and the application information collation processing, and thus the request controller 60 may determine whether or not to permit download.

Figure 17:
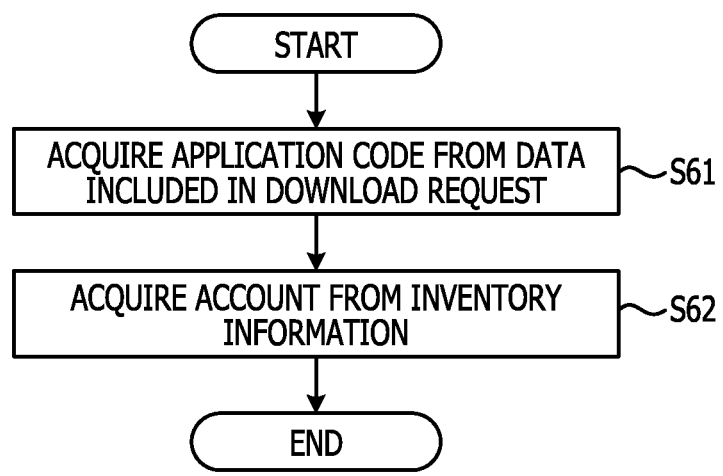
FIG. 17 is a flowchart illustrating a flow of request analysis processing.

A flow of request analysis processing will be described below. FIG. 17 is a flowchart illustrating the flow of the request analysis processing. As illustrated in FIG. 17, the request analyzer 63 acquires an application code from data included in a download request (step S61). The request analyzer 63 acquires an account from the inventory information (step S62).

In this manner, the request analyzer 63 analyzes the download request and acquires the application code, and thus the request controller 60 may determine whether or not to download the application.

Figure 18:
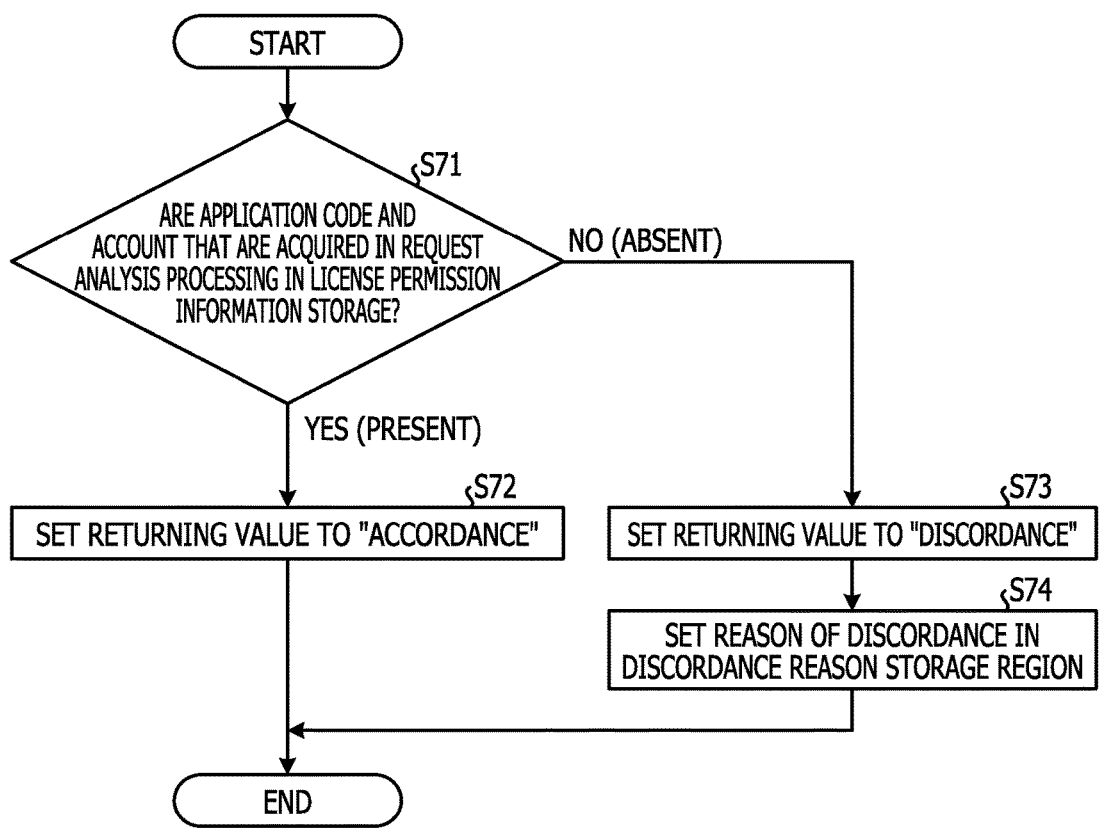
FIG. 18 is a flowchart illustrating a flow of license permission collation processing.

A flow of license permission collation processing will be described below. FIG. 18 is a flowchart illustrating the flow of the license permission collation processing. As illustrated in FIG. 18, the license permission collator 64 determines whether or not the application code and the account that are acquired in the request analysis processing are in the license permission information storage 62 (step S71).

As a result, when being in the license permission information storage 62, the license permission collator 64 sets the returning value to "accordance" (step S72). When not being in the license permission information storage 62, the license permission collator 64 sets the returning value to "discordance" (step S73) and sets a reason of discordance in a discordance reason storage region (step S74). Here, the discordance reason storage region refers to a storage region of the prohibition reason of the download prohibition application information included in the inventory information.

In this manner, the license permission collator 64 determines whether or not the application code and the account are in the license permission information storage 62, and thus the license permission collator 64 may determines whether or not to download the application.

Figure 19:
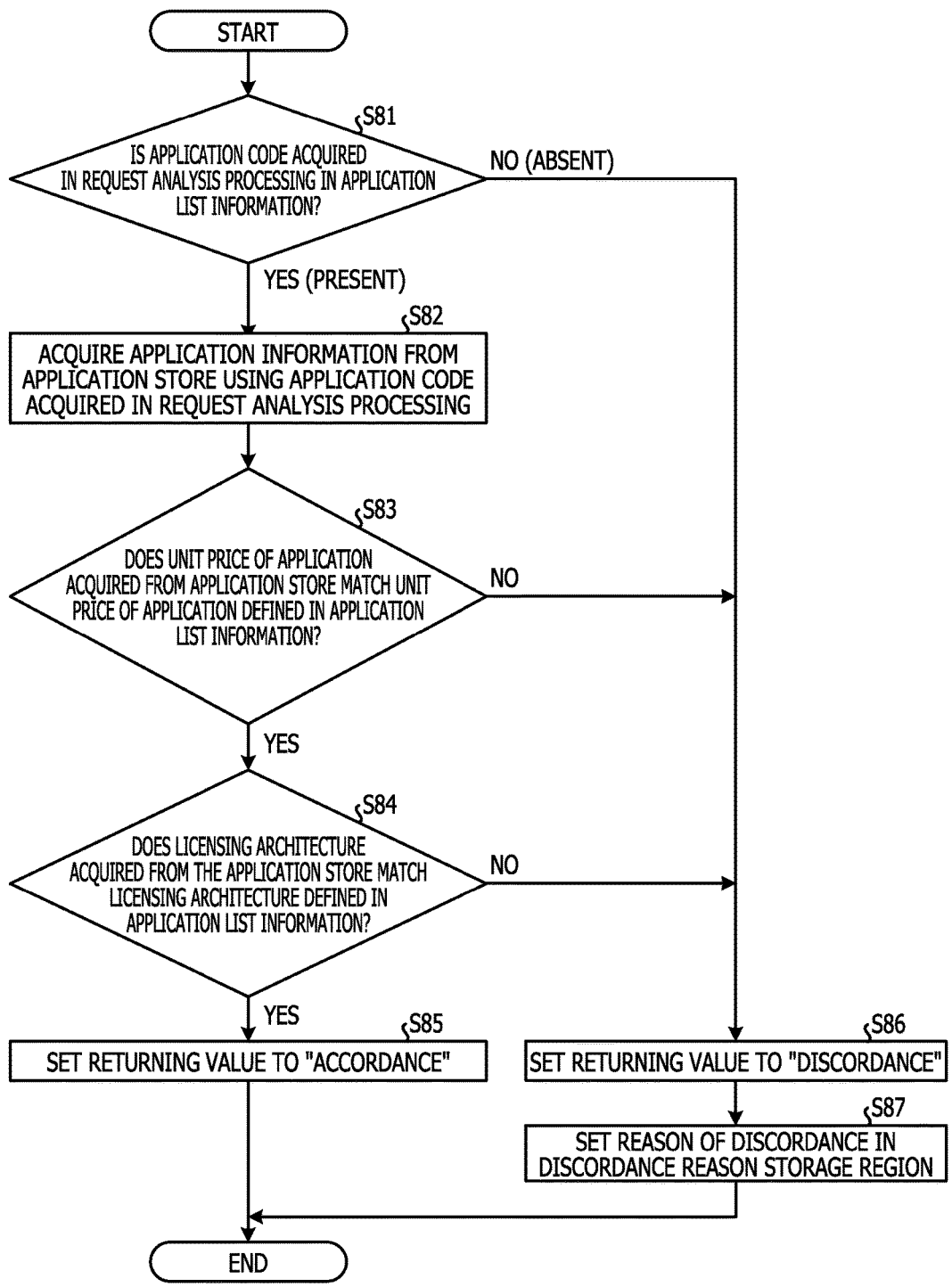
FIG. 19 is a flowchart illustrating a flow of application information collation processing.

A flow of application information collation processing will be described below. FIG. 19 illustrates a case where the collation method ID of the operation policy information is "001". FIG. 19 is a flowchart illustrating the flow of the application information collation processing. As illustrated in FIG. 19, the application information collator 65 determines whether or not the application code acquired in the request analysis processing is in the application list information (step S81).

As a result, when being in the application list information, the application information collator 65 acquires application information from the application store 6 via the latest information acquirement section 52 using the application code acquired in the request analysis processing (step S82).

The application information collator 65 determines whether or not a unit price of the application acquired from the application store 6 matches the unit price of the application defined in the application list information (step S83).

As a result, when matching, the application information collator 65 determines whether or not a licensing architecture acquired from the application store 6 matches the licensing architecture defined in the application list information (step S84). As a result, when matching, the application information collator 65 sets the returning value to "accordance" (step S85).

When the licensing architectures do not match each other or when the unit prices do not match each other, the application information collator 65 sets the returning value to "discordance" (step S86) and sets a reason of discordance in the discordance reason storage region (step S87). Even when the application code acquired in the request analysis processing is not in the application list information, the application information collator 65 sets the returning value to "discordance" and sets the reason of discordance in the discordance reason storage region.

In this manner, the application information collator 65 determines whether or not to download the application based on the unit price of the application and the licensing architecture that are acquired from the application store 6, and thus it is possible to block excess of the application purchase budget.

Figure 20:
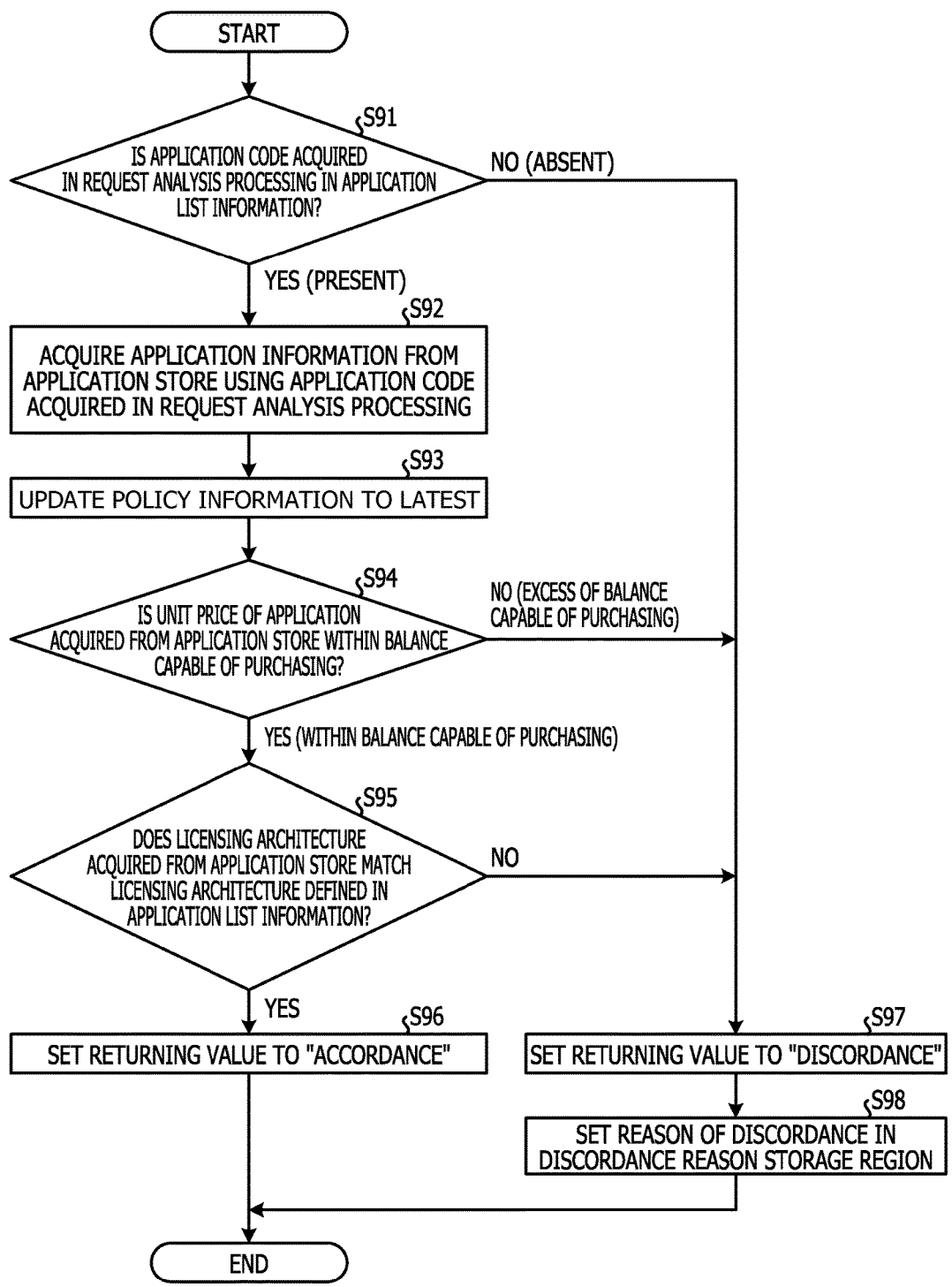
FIG. 20 is a flowchart illustrating a flow of the application information collation processing when application information collation is determined with a total budget.

FIG. 19 illustrates a case where the collation method ID of the operation policy information is "001". However, the application information collator 65 determines whether or not to download the application within a total budget when the collation method ID of the operation policy information is "002". FIG. 20 is a flowchart illustrating a flow of the application information collation process when application information collation is determined with the total budget.

As illustrated in FIG. 20, the application information collator 65 determines whether or not an application code acquired in the request analysis processing is in the application list information (step S91).

As a result, when being in the application list information, the application information collator 65 acquires application information from the application store 6 via the latest information acquirement section 52 using the application code acquired in the request analysis processing (step S92).

The application information collator 65 updates the policy information to the latest (step S93). The application information collator 65 may acquire information of the latest balance capable of purchasing by updating the policy information to the latest.

The application information collator 65 determines whether or not a unit price of the application acquired from the application store 6 is within the balance capable of purchasing (step S94). As a result, when being within the balance capable of purchasing, the application information collator 65 determines whether or not a licensing architecture acquired from the application store 6 matches the licensing architecture defined in the application list information (step S95). As a result, when matching, the application information collator 65 sets the returning value to "accordance" (step S96).

When the licensing architectures do not match each other or when the unit price is not within the balance capable of purchasing, the application information collator 65 sets the returning value to "discordance" (step S97), and sets a reason of discordance in the discordance reason storage region (step S98). Even when the application code acquired in the request analysis processing is not in the application list information, the application information collator 65 sets the returning value to "discordance" and sets a reason of discordance in the discordance reason storage region.

In this manner, the application information collator 65 determines whether or not to download the application based on the unit price of the application acquired from the application store 6 and the balance capable of purchasing, and thus it is possible to block excess of the application purchase budget.

Figure 21:
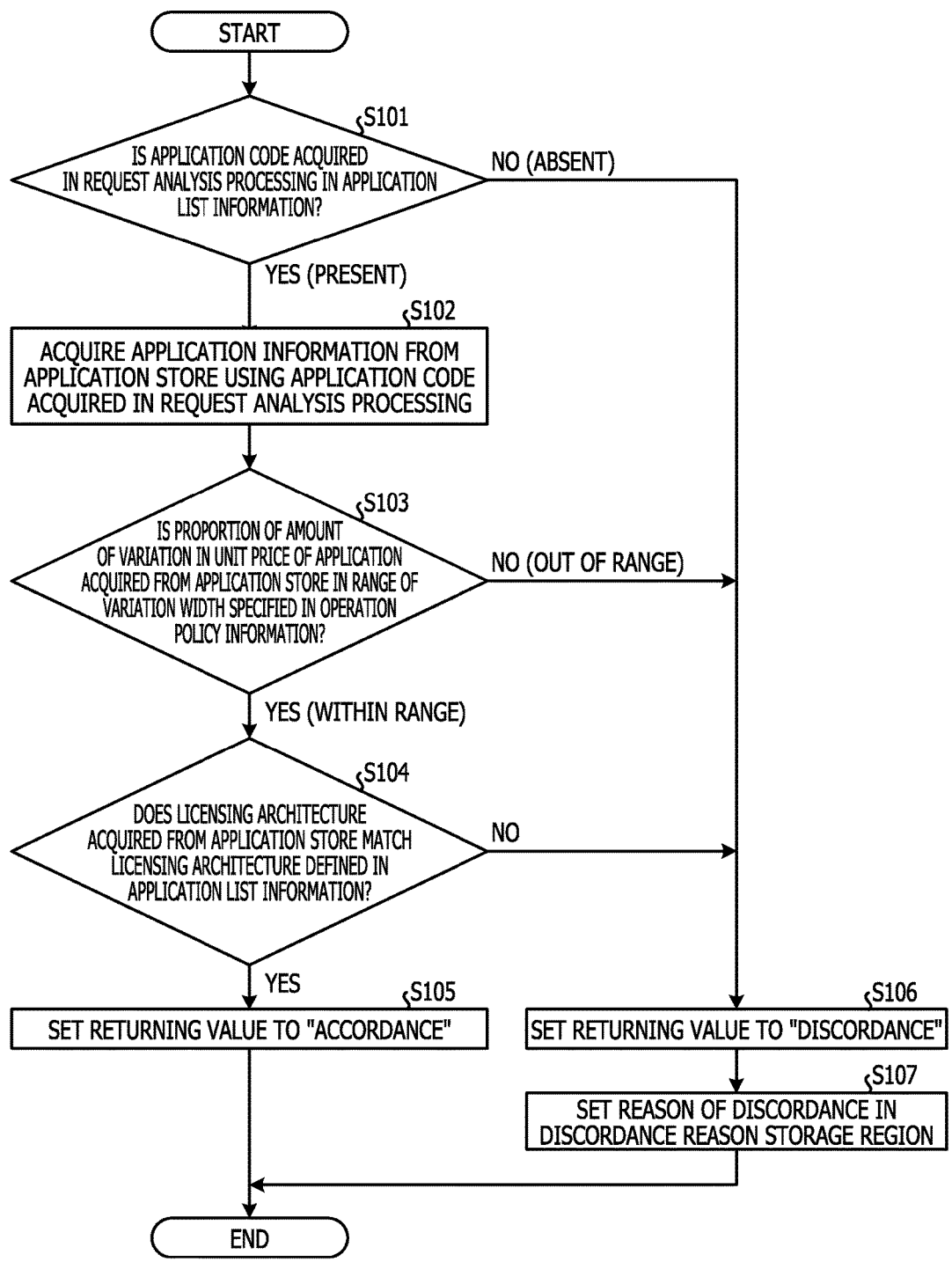
FIG. 21 is a flowchart illustrating a flow of the application information collation processing when the application information collation is determined by using variation width in a unit price of an application.

The application information collator 65 determines whether or not to download the application using the variation width in the unit price of the application when the collation method ID of the operation policy information is "003". FIG. 21 is a flowchart illustrating a flow of the application information collation process when the application information collation is determined with variation width in the unit price of the application.

As illustrated in FIG. 21, the application information collator 65 determines whether or not the application code acquired in the request analysis processing is in the application list information (step S101).

As a result, when being in the application list information, the application information collator 65 acquires the application information from the application store 6 via the latest information acquirement section 52 using the application code acquired in the request analysis processing (step S102).

The application information collator 65 determines whether or not the proportion of an amount of variation in unit price of the application acquired from the application store 6 is in a range of the variation width specified in the operation policy information (step S103).

As a result, when being in a range of the variation width, the application information collator 65 determines whether or not a licensing architecture acquired from the application store 6 matches the licensing architecture defined in the application list information (step S104). As a result, when matching, the application information collator 65 sets the returning value to "accordance" (step S105).

When the licensing architectures do not match each other or when being not in a range of the variation width, the application information collator 65 sets the returning value to "discordance" (step S106), and sets a reason of discordance in the discordance reason storage region (step S107). Even when the application code acquired in the request analysis processing is not in the application list information, the application information collator 65 sets the returning value to "discordance" and sets a reason of discordance in the discordance reason storage region.

In this manner, the application information collator 65 determines whether or not to download the application based on the unit price of the application acquired from the application store 6 and the range of the variation width of the operation policy information, and thus it is possible to block excess of the application purchase budget.

As described above, in the embodiment, the management apparatus 2 distributes the application list information, the license permission information, and the policy information to the agent 30. The license permission collator 64 in the agent 30 determines whether or not to download an application based on the license permission information. The application information collator 65 determines whether or not to download the application based on the policy information, the application list information, and the application information including the latest price and the licensing architecture. Accordingly, even when the purchase condition of the application is different from that at the time of distribution from the management apparatus 2, for example, when the price or licensing architecture of the application change, it is possible for the agent 30 to accurately determine propriety of purchasing.

Specifically, the application information collator 65 determines whether or not to download an application by whether or not the price and the licensing architecture of the application that are included in the application list information distributed by the management apparatus 2 matches respectively the latest price and the latest licensing architecture. Accordingly, it is possible for the agent 30 to block purchase of an application having a different price or licensing architecture.

The application information collator 65 may determine whether or not to download an application by whether or not the latest price of the application is within the balance capable of purchasing included in the policy information that is distributed by the management apparatus 2. Accordingly, it is possible for the agent 30 to block purchasing of an application with excess of the purchase budget.

The application information collator 65 may determine whether or not to download an application by whether or not a proportion of an amount of variation in the latest price of the application is within a predetermined variation width included in the policy information. Accordingly, it is possible for the agent 30 to block purchasing of an application with excess of the purchase budget.

In the embodiment, the agent 30 is described. However, the agent 30 is a purchase control program realized by software, as a local proxy. Thus, a hardware configuration of the computer 3a will be described below and the computer 3a executes the purchase control program.

Figure 22:
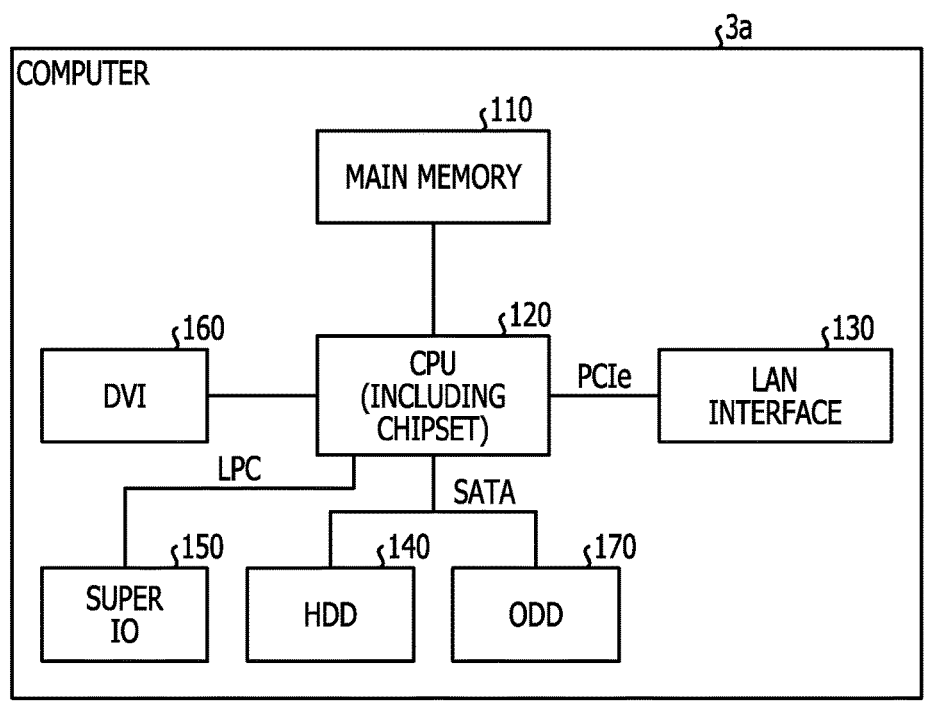
FIG. 22 is a diagram illustrating a hardware configuration of a computer executing a purchase control program.

FIG. 22 is a diagram illustrating the hardware configuration of the computer 3a executing the purchase control program. As illustrated in FIG. 22, the computer 3a includes a main memory 110, a central processing unit (CPU) 120, a local area network (LAN) interface 130, and a hard disk drive (HDD) 140. The computer 3a includes a super input and output (IO) 150, a digital visual interface (DVI) 160, and an optical disk drive (ODD) 170.

The main memory 110 is a memory storing a program, an intermediate result in executing a program or the like. The CPU 120 is a central processing device that reads the program from the main memory 110 and executes the read program. The CPU 120 includes a chipset having a memory controller.

The LAN interface 130 is an interface for connecting the computer 3a to another computer through a LAN. The HDD 140 is a disk device storing a program or data. The super IO 150 is an interface for connecting an input device such as a mouse or a keyboard. The DVI 160 is an interface for connecting a liquid crystal display apparatus. The ODD 170 is a device that reads and writes data in a DVD.

The LAN interface 130 is connected to the CPU 120 by a PCI Express. The HDD 140 and ODD 170 are connected to the CPU 120 by a serial advanced technology attachment (SATA). The super IO 150 is connected to the CPU 120 by a low pin count (LPC).

The purchase control program executed in the computer 3a is stored in a DVD, read from the DVD by the ODD 170, and installed on the computer 3a. The purchase control program may be stored in databases of other computer systems connected through the LAN interface 130, read from the database and installed on the computer 3a. The installed purchase control program is stored in the HDD 140, read in the main memory 110, and executed by the CPU 120.

In the embodiment, the management apparatus 2 is described. However, a property management program may be obtained by realizing the functional configuration included in the management apparatus 2 with software. The property management program is executed in a computer having a hardware configuration similar to the hardware configuration illustrated in FIG. 22.

In the embodiment, a case of purchasing an application is described. However, the embodiment is not limited thereto, and for example, a case of purchasing music or a movie may be applied similarly.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method comprising:
    acquiring, by a processor in a client device from a management server coupled to the client device via a network, information relating to a software that is installable, the information including a first information indicating whether an installation of the software on the client device is permitted, and a second information indicating condition for installing the software according to at least one of a price of the software and a licensing architecture of the software, wherein the information relating to the software is acquired before the processor receives an installation request for the software;
    receiving, by the processor in the client device, the installation request for the software;
    after receiving the installation request for the software, performing, by the processor in the client device, a first determination regarding whether an installation of the software on the client device is permitted based on the acquired first information;
    when the first determination determines that the installation of the software on the client device is permitted, performing, by the processor in the client device, a second determination regarding whether the installation of the software on the client device satisfies the condition for installing the software based on the acquired second information,
    when the second determination determines that the condition for installing the software is satisfied, the processor causing the software to be installed on the client device; and
    when at least one of (i) the installation of the software on the client device is not permitted and (ii) the condition for installing the software is not satisfied, the processor prohibiting the software from being installed on the client device,
    wherein the first determination and the second determination are made before the software is installed on the client device.

2. The method of claim 1, further comprising:
    acquiring information on a latest price of the software from a distributor of the software after receiving the installation request for the software; and
    in performing the second determination, determining whether the latest price matches the price of the software according to the acquired second information.

3. The method of claim 1, further comprising:
    acquiring information on a latest price of the software from a distributor of the software after receiving the installation request for the software;
    specifying a balance available for installing the software based on the acquired second information; and
    in performing the second determination, determining whether the latest price is within the balance available for installing the software.

4. The method of claim 1, further comprising:
    acquiring information on a latest price of the software from a distributor of the software after receiving the installation request for the software;
    in performing the second determination, determining whether a difference between the latest price and the price of the software according to the acquired second information is within a predetermined range.

5. The method of claim 1, further comprising:
    when prohibiting the installation of the software on the client device, transmitting a reason for the prohibition to the management server.

6. A system comprising:
    a memory; and
    a processor in a client device, the processor being coupled to the memory and the client device being coupled to a management server via a network, the processor in the client device being configured to execute a process comprising:
    acquiring information relating to a software that is installable, the information including a first information indicating whether an installation of the software on the client device is permitted, and a second information indicating condition for installing the software according to at least one of a price of the software and a licensing architecture of the software, wherein the information relating to the software is acquired before the processor receives an installation request for the software;

receiving the installation request for the software;

after receiving the installation request for the software, performing a first determination regarding whether an installation of the software on the client device is permitted based on the acquired first information;

when the first determination determines that the installation of the software on the client device is permitted, performing a second determination regarding whether the installation of the software on the client device satisfies the condition for installing the software based on the acquired second information;

when the second determination determines that the condition for installing the software is satisfied, causing the software to be installed on the client device; and when at least one of (i) the installation of the software on the client device is not permitted and (ii) the condition for installing the software is not satisfied, prohibiting the software from being installed on the client device, wherein the first determination and the second determination are made before the software is installed on the client device.

7. A non-transitory computer-readable medium including a program, which when executed by a computer, causes the computer to execute a process, the process comprising:

acquiring, by a processor in a client device from a management server coupled to the client device via a network, information relating to a software that is installable, the information including a first information indicating whether an installation of the software on the client device is permitted, and a second information indicating condition for installing the software according to at least one of a price of the software and a licensing architecture of the software, wherein the information relating to the software is acquired before the processor receives an installation request for the software;

receiving, by the processor in the client device, the installation request for the software;

after receiving the installation request for the software, performing, by the processor in the client device, a first determination regarding whether an installation of the software on the client device is permitted based on the acquired first information;

when the first determination determines that the installation of the software on the client device is permitted, performing, by the processor in the client device, a second determination regarding whether the installation of the software on the client device satisfies the condition for installing the software based on the acquired second information;

when the second determination determines that the condition for installing the software is satisfied, the processor causing the software to be installed on the client device; and when at least one of (i) the installation of the software on the client device is not permitted and (ii) the condition for installing the software is not satisfied, the processor prohibiting the software from being installed on the client device wherein the first determination and the second determination are made before the software is installed on the client device.

* * * * *